(12) United States Patent
Iseki

(10) Patent No.: US 7,459,875 B2
(45) Date of Patent: Dec. 2, 2008

(54) CONTROL DEVICE FOR STEPPING MOTOR

(75) Inventor: Yukimasa Iseki, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/831,023

(22) Filed: Jul. 31, 2007

(65) Prior Publication Data

US 2007/0278982 A1    Dec. 6, 2007

Related U.S. Application Data

(62) Division of application No. 10/369,533, filed on Feb. 21, 2003, now Pat. No. 7,268,512.

(30) Foreign Application Priority Data

Feb. 27, 2002    (JP)    ............... 2002-051258

(51) Int. Cl.
*H02P 8/00* (2006.01)
(52) U.S. Cl. ................... 318/696; 318/685
(58) Field of Classification Search ........... 318/685, 318/696, 700, 400.09, 701
See application file for complete search history.

(56) References Cited

U.S. PATENT DOCUMENTS

| | | | |
|---|---|---|---|
| 3,818,261 A | 6/1974 | Clarke, Jr. ............... | 318/696 |
| 4,362,980 A | 12/1982 | Itzkowitz ............... | 318/685 |
| 4,476,421 A * | 10/1984 | Moriguchi ............... | 318/696 |
| 4,658,192 A * | 4/1987 | Casteel et al. ............ | 318/257 |
| 4,661,754 A * | 4/1987 | Tajima et al. ............. | 318/696 |
| 4,672,283 A | 6/1987 | Kobayashi ............... | 318/696 |
| 4,833,372 A | 5/1989 | Kobayashi et al. ......... | 316/696 |
| 5,574,351 A * | 11/1996 | Jacobson et al. .......... | 318/696 |
| 5,583,410 A | 12/1996 | Jacobson et al. .......... | 318/696 |
| 5,703,454 A * | 12/1997 | Taguchi ................. | 318/685 |
| 2001/0017470 A1* | 8/2001 | Takaoka et al. .......... | 290/40 C |

FOREIGN PATENT DOCUMENTS

JP    3-285599    12/1991

* cited by examiner

*Primary Examiner*—Bentsu Ro
(74) *Attorney, Agent, or Firm*—Fitzpatrick, Cella, Harper & Scinto

(57) ABSTRACT

A pattern register stores an excitation pattern of stepping motors. A first pattern control unit reads out an excitation pattern for n bits from a predetermined address of a pattern register for supplying the same to an external motor driver. A second pattern control unit reads out an excitation pattern for the same n bits as in the first pattern control unit from a predetermined address of the pastern register and supplies the same to an external motor driver. An output control unit selectively outputs a first output mode for using the first pattern control means and the second pattern control means independently, or a second output mode for using them in an interlocked manner.

7 Claims, 7 Drawing Sheets

CONTROL DEVICE FOR STEPPING MOTOR

This is a divisional of application Ser. No. 10/369,533, filed on Feb. 21, 2003, now U.S. Pat. No. 7,268,512 B2.

BACKGROUND OF THE INVENTION

1. Field of the Invention

The present invention relates to a control device and control method for a stepping motor, and an image forming apparatus used for transmitting the driving force in a copying machine, a printer, a facsimile, or the like.

2. Related Background Art

A stepping motor used in an image forming apparatus or the like is a motor for driving by supplying a predetermined excitation pattern to the motor driver so that the rotation can be controlled for a stepping angle corresponding to the supplied excitation pattern.

Conventionally, the above-mentioned excitation pattern of the stepping motor is generated from a control CPU or using a dedicated circuit. Moreover, since an inexpensive stepping motor comprises an A phase, an A* phase, a B phase and a B* phase, the number of supply pattern lines to the motor driver is commonly four. Therefore, in a circuit for generating the excitation pattern, in general a pattern generation block is constituted by the four lines for each unit.

Moreover, when a smooth operation is further required depending on an object to be driven, the stepping motor can be driven using a motor driver capable of achieving a complicated excitation control. Among the motor drivers capable of achieving the complicated operation, there are those which cannot transmit the complicated control information with the four excitation pattern lines, so that the stepping motor is driven using a large number of controlling lines of 6 lines, 8 lines, or the like.

When the excitation pattern is generated by the control CPU as mentioned above, generation of the excitation pattern of the stepping motor itself may be a large load, depending on the size of the control job for the device to be the object. Then, in order to alleviate the load on the software, it is necessary to generate the excitation pattern using a dedicated pattern generating circuit.

However, also as to the dedicated pattern generating circuit, a problem of the circuit size thereof exists. That is, the interface of the motor driver to be the object and the driving method therefor varies widely, so that even if the exciting method is the same two-phase excitation, the excitation pattern to be supplied may be different depending on the kind of the stepping motor driver to be the object. Moreover, as mentioned above, there are many motor drivers which cannot be driven correctly without use of 6 lines or 8 lines instead of 4 lines. Therefore, in order to correspond to various kinds of motor drivers, it is necessary to provide the driving circuits with interfaces for the various kinds of motor drivers, respectively. However, a problem is involved in that it may lead to enlargement of the circuit size and the cost increase.

SUMMARY OF THE INVENTION

In view of the above-mentioned problems, the present invention has been achieved, and an object thereof is to provide a control device and control method for a stepping motor capable of dealing with various kinds of excitation patterns in a simple configuration without enlargement of the circuit size, and an image formatting apparatus.

That is, the present invention provides a control device for a stepping motor, comprising: storage means for storing an excitation pattern of the stepping motor; first pattern control means for reading an excitation pattern for n bits from a predetermined address of the storage means and supplying the excitation pattern to an external motor driver; second pattern control means for reading an excitation pattern for the same n bits as in the first pattern control means from a predetermined address of the storage means and supplying the excitation pattern to an external motor driver; and output control means capable of selecting a first output mode for using the first pattern control means and the second pattern control means independently, or a second output mode for using the first pattern control means and the second pattern control means in an interlocked manner.

Moreover, the present invention provides a control method for a stepping motor, comprising: a memory step of storing an excitation pattern of the stepping motor in storage means; a first pattern control step of reading an excitation pattern for n bits from a predetermined address of the storage means and supplying the excitation pattern to an external motor driver; a second pattern control step of reading an excitation pattern for the same n bits as in the first pattern control step from a predetermined address of the storage means and supplying the excitation pattern to an external motor driver; and an output control step of selecting a first output mode for controlling the first pattern control step and the second pattern control step independently, or a second output mode for controlling the first pattern control step and the second pattern control step in an interlocked manner.

The objects and effects mentioned above and other objects and effects of the present invention are apparent from the explanation given below.

DESCRIPTION OF THE PREFERRED EMBODIMENTS

Figure 1:
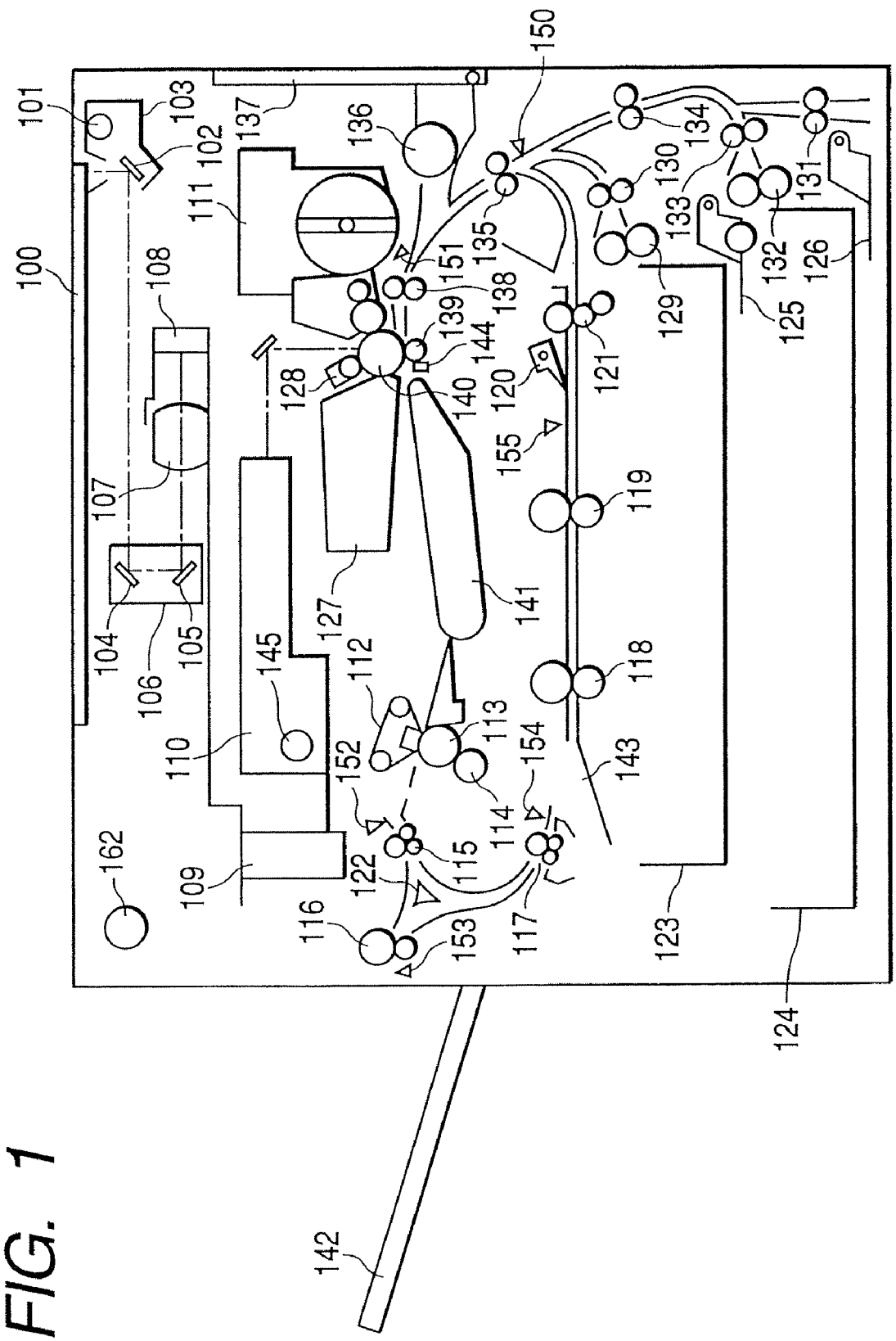
FIG. 1 is a cross-sectional view showing the configuration of an image forming apparatus according to the present invention.

FIG. 1 is a cross-sectional view showing the configuration of an image forming apparatus according to the present invention. It shows the main body configuration of a digital composite machine with the electrophotography method adopted.

In the configuration of FIG. 1, an exposing lamp 101 comprising a fluorescent lamp, a halogen lamp or the like, illuminates an original on an original placing glass (platen glass) 100 while moving in the direction perpendicular to the longitudinal direction thereof. A scattered light from the original according to the illumination by the exposing lamp 101 is reflected by first, second and third mirrors 102, 104, 105 so as to reach a lens 107.

At the time, with respect to movement of a first movable member 103 comprising the exposing lamp 101 and the first mirror 102, a second movable member 106 comprising the second mirror 104 and the third mirror 105 is moved by a ½ speed so that the distance from the illuminated original surface to the lens 107 is always maintained constantly.

Then, an image on the original is focused on a light receiving unit of a CCD line sensor 108 with several thousands light receiving elements arranged in a line-like form via the mirrors 102, 104, 105 and the lens 107, and subjected to photoelectric transfer sequentially per line unit. A signal obtained by the photoelectric transfer is processed by a signal processing unit (not shown) so as to output a PWM modulated image signal.

An exposing control unit 110 drives a semiconductor laser 145 based on the above-mentioned PWM modulated image signal from the signal processing unit so as to irradiate a laser beam to the surface of a photosensitive member 140. At the time, a light beam is deflection-scanned, by a polygon mirror, in the direction parallel to the axis of the drum-like photosensitive member 140. Moreover, the exposing control unit 5 110 is cooled down by a cooling fan 109.

The above-mentioned photosensitive member 140 has the residual charge on the drum eliminated by a pre-exposing lamp (not shown) before irradiating the light beam, and has the surface charged uniformed by a primary charger 128. Therefore, by receiving a light beam while rotation, the photosensitive member 140 has an electrostatic latent image formed on the drum surface. Then the electrostatic latent image on the surface of the photosensitive member 140 is visualized by a developer 111 with a developing agent (toner) of a predetermined color.

In contrast, in paper-to-be-transferred piling units 123, 124, papers to be transferred of a standard size are piled up and stored. Lift-ups 125, 126 are for the operation of lifting up the papers to be transferred stored in the paper-to-be-transferred piling units 123, 124 to the position of a feeding roller pair 129, 132. The feeding roller pair 129, 132 is driven by the same motor (not shown). According to changeover of the rotation direction thereof, the papers to be transferred are fed selectively from one of the paper-to-be-transferred piling units 123, 124. Moreover, the pair rollers of the paper roller pair 129, 132 have a torque applied in the inverted rotation direction with respect to paper feeding for preventing overlap feeding of the recording media.

Feeding rollers 130, 133, 134, 135 feed the papers to be transferred from the paper-to-be-transferred piling units 123, 124 to a regist roller 138. In this embodiment, third and fourth paper-to-be-transferred piling units can further be interlocked to the downward for enlargement. A feeding roller 131 guides the papers to be transferred from the paper-to-be-transferred piling unit interlocked downward, to the feeding rollers 130, 133, 134, 135. Moreover, when a manual paper feeding mode is selected on the operation part, a manual feeding tray 137 is opened for manually feeding a paper to be transferred so that a paper feeding roller 136 feeds the manually fed paper to be transferred to the regist roller 138.

The regist roller 138 feeds the paper to be transferred to a transfer position with taking synchronization between the timing of the tip end of the image formed on the photosensitive member 140 and the timing of the tip end of the paper to be transferred. Then, a transfer charger 139 transfers the toner image developed on the photosensitive member 140 to the paper to be transferred. After the transfer, the photosensitive member 140 has the residual toner eliminated by a cleaner 127.

Since the curvature of the photosensitive member 140 is large, the above-mentioned transferred paper to be transferred can easily be separated from the photosensitive member 140. By further applying a voltage to a charge eliminating needle 144, the suction force between the photosensitive member 140 and the paper to be transferred can be weakened so as to facilitate the separation.

The separated paper to be transferred is sent to fixing units 112, 113 by a conveying belt 141 for fixing a toner. The fixing unit 112 comprises a ceramic heater, a film and two rollers. The heat of the ceramic heater is transmitted efficiently via the thin film. A cooling roller 114 discharges the heat of the fixing unit 113. A feeding roller 115 comprises a large roller and two small rollers for feeding the paper to be transferred from the fixing units 112, 113 as well as correcting curling of the paper to be transferred.

A direction flapper 122 switches the conveying direction of the paper to be transferred according to the operation mode. In a mode for transfer on one side of the paper to be transferred (at the time of one side recording), a path from the feeding roller 115 to a discharge opening is selected. A discharge roller pair 116 discharges the paper to be transferred after the image formation so as to be piled onto a discharge paper tray 142.

In FIG. 1, reference numerals 117, 118, 119 and 121 represent conveying rollers for a paper to be transferred, 120, 150, 151, 152, 153, 154 and 155 represent sensors for detecting a paper to be transferred, 143 represents a conveying path, and 162 represents a control unit.

Here, as a motor (paper feeding motor) for driving the above-mentioned feeding roller pair 129, 132 and a motor (paper discharging motor) for driving discharge roller pair 116, stepping motors are used. The motors are driven by using a motor control circuit of an embodiment described later.

Figure 2:
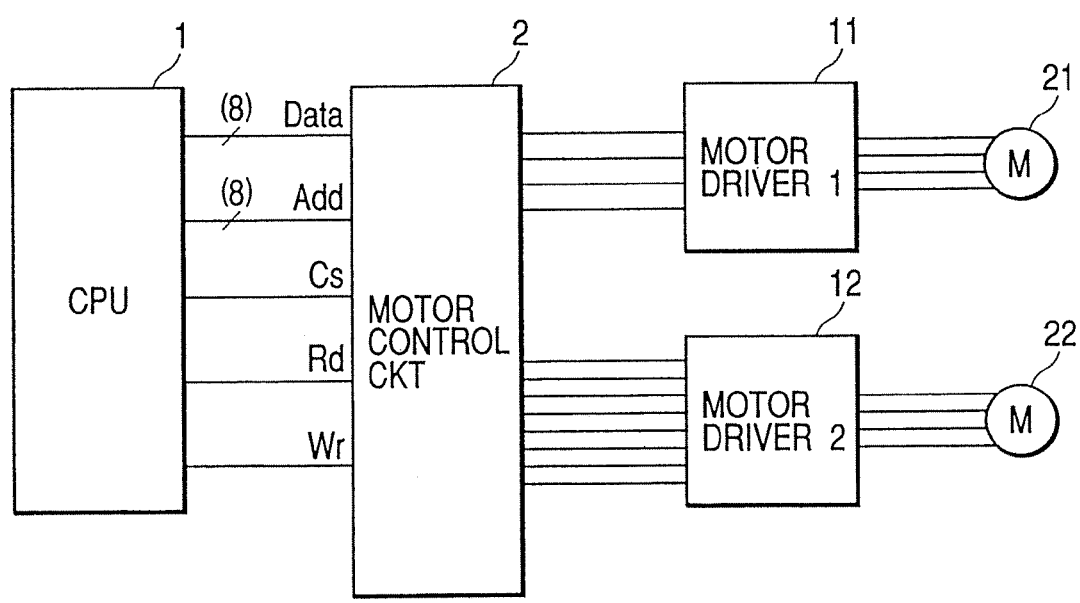
FIG. 2 is a block diagram showing the configuration of an embodiment of the present invention.

FIG. 2 is a block diagram showing the configuration of an embodiment of the present invention. It shows the connecting configuration of the above-mentioned stepping motor driving circuit. In FIG. 2, a control CPU 1 controls the image forming apparatus, and a motor control circuit 2 controls the drive of motors (stepping motors) 21, 22 via motor drivers (first, second) 11, 12.

Here, the motor 21 is a paper feeding motor used in the above-mentioned image forming apparatus, and the motor 22 is the paper discharging motor. Since the paper discharging motor requires further minute control, the excitation pattern is complicated so that it is connected with the motor driver 12 requiring a large number of signals.

Moreover, the motor control circuit 2 is operated according to data setting from the control CPU 1 for supplying an excitation pattern to the motor drivers 11, 12.

Figure 3:
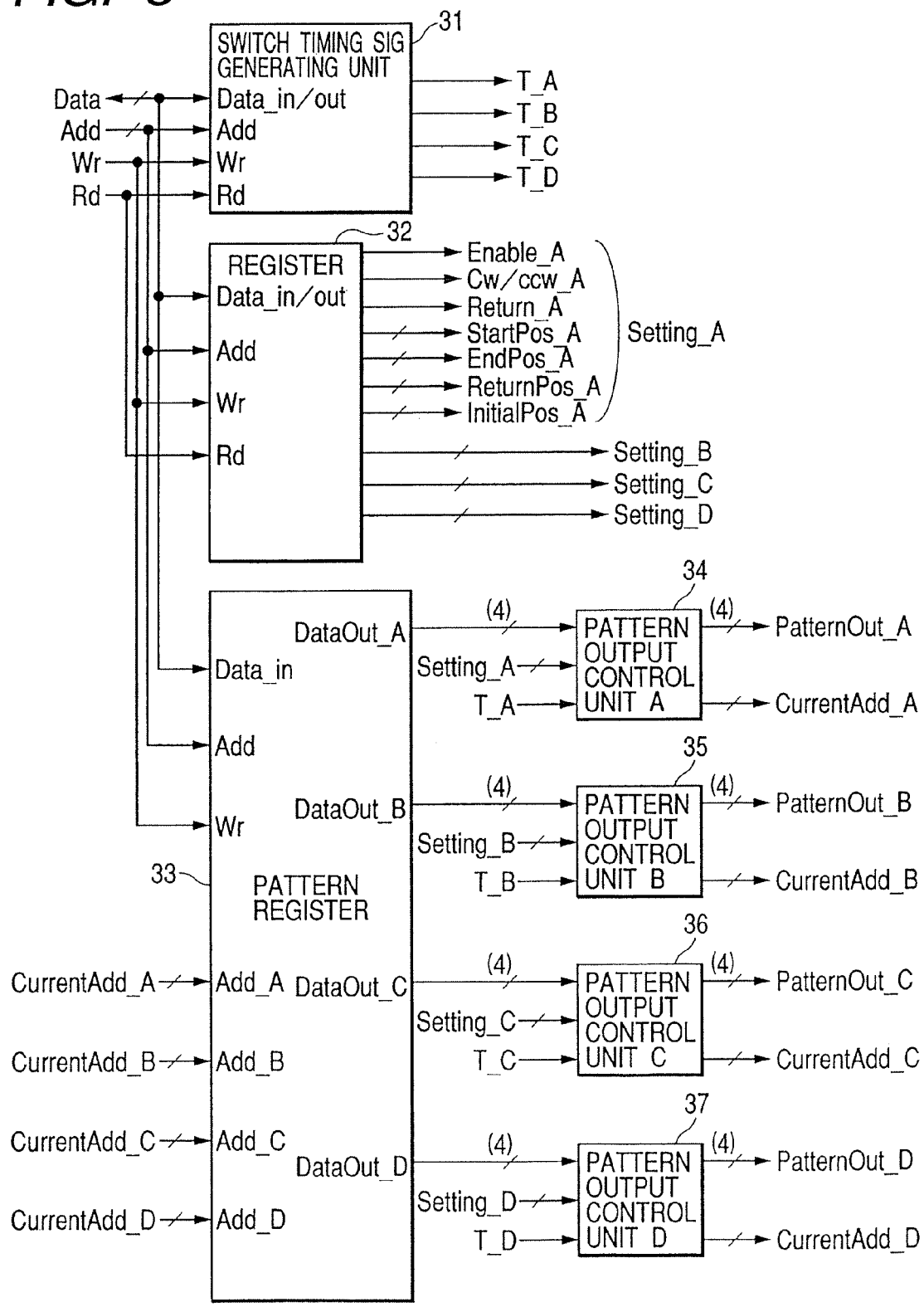
FIG. 3 is a block diagram showing the configuration of a motor control circuit of this embodiment.

FIG. 3 is a block diagram showing the internal configuration of the above-mentioned motor control circuit 2. This control circuit 2 comprises a changeover timing generating unit 31, a register 32, a pattern register 33 and pattern output control units 34 to 37.

A changeover timing generating unit 31 generates trigger signals (pattern transition timing signals) showing the transition timing (T_x) (x=A, B, C, D) of the excitation pattern which is read out from the pattern register 33 for the pattern output control units 34 to 37. According to the generation of the trigger signals, the excitation pattern is switched.

The register 32 sets and outputs the next register value for controlling the pattern output control units 34 to 37.

Enable_x: permission signal for the pattern output
"0"=inhibit the pattern output, output a pattern register value represented by Initial Pos_x
"1"=output a register value read out from the pattern register 33

Cw/ccw_x: rotation direction signal
"0"=clockwise (CW); increment Current Add_x by one at the rising edge of T_x, read the next data "1"=counterclockwise (CCW); decrement Current Add_x by one at the rising edge of T_x, read the next data Return_x: initial position return signal "0"=ordinary rotation operation "1"=return to the initial position, output a pattern register value represented by Retrun_x StartPos_x: address showing the start position of the pattern EndPos_x: address showing the end position of the pattern ReturnPos_x: address showing the initial position of the pattern InitialPox_x: address showing the output data in the non-rotation state The pattern register 33 is a register (storage means) for storing the output excitation pattern to the motors 21, 22, which register stores the excitation pattern from the control CPU 1 in advance before the rotation operation. Then, it outputs the DataOut_x to the pattern output control unit 34 to 37 corresponding to the demand address (CurrentAdd_x) from the pattern output control units 34 to 37.

The above-mentioned pattern output control units 34 to 37 provides pattern control means for generating an excitation pattern to be supplied to the external motor drivers 11, 12. When a rotation command (Enable_x="1") is set, it causes the internal counter to count up or count down by every rising edge of the trigger signal showing the transition timing (T_x) and outputs the address showing the next excitation pattern as the CurrentAdd_x. Then, it receives new excitation pattern data from the pattern register 33 so as to supply the same to the external motor drivers 11, 12 as mentioned above.

Here, in this embodiment, for example, first pattern control means for reading an excitation pattern for n (n is a positive integer) bits from a predetermined address of the pattern register 33 and supplying the excitation pattern to the external motor drivers 11, 12 is defined to be the pattern output control unit 34. Second pattern control means for reading an excitation pattern for the same n bits as in the first pattern control means from a predetermined address of the above-mentioned pattern register 33 and supplying the same to the external motor drivers 11, 12 is defined to be the pattern output control unit 35.

Moreover, the register 32 is output control means capable of selecting a first output mode (output n (e.g. 4) bit*1 (*1 indicates one channel or the like) or n (e.g. 4) bit*2 (*2 indicates another channel)) for using the first pattern control means and the second pattern control means independently, or a second output mode (output n*2 (e.g. 8) bit*1 (*1 indicates one collective channel)) for using the first pattern control means and the second pattern control means in an interlocked manner.

When the first output mode is selected by the above-mentioned output control means (register 32), each pattern transition timing signal is inputted to the pattern control means (pattern output control units 34, 35). When the second output mode is selected, the same pattern transition timing signal is inputted to the pattern control means.

Moreover, when the second output mode is selected by the above-mentioned output control means, the same pattern transition timing signal to be inputted to the first pattern control means and the second pattern control means is a signal capable of selecting whether the first pattern transition timing signal is used or the second pattern transition timing signal is used.

Figure 4:
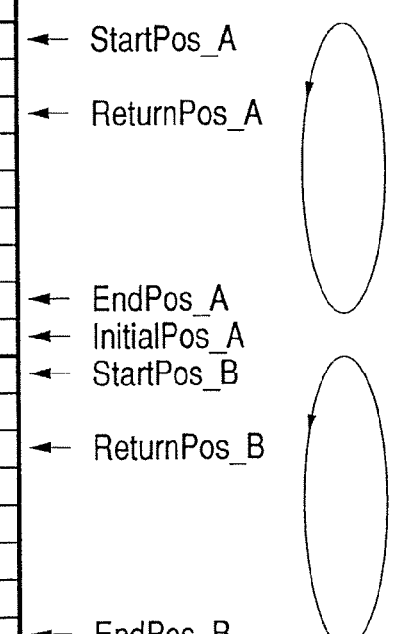
FIG. 4 is an explanatory diagram showing a setting example of a pattern register.

FIG. 4 shows a setting example of the pattern register 33 when the excitation pattern is to be outputted using the pattern output control units (A, B) 34, 35. As shown in the figure, data are preset from the address 0 to 17. Furthermore, the addresses to be set in the pattern output control units 34, 35 are allotted. Here, the starting value of the pattern output control unit (A) 34 is set to be the address 2.

Figure 5:
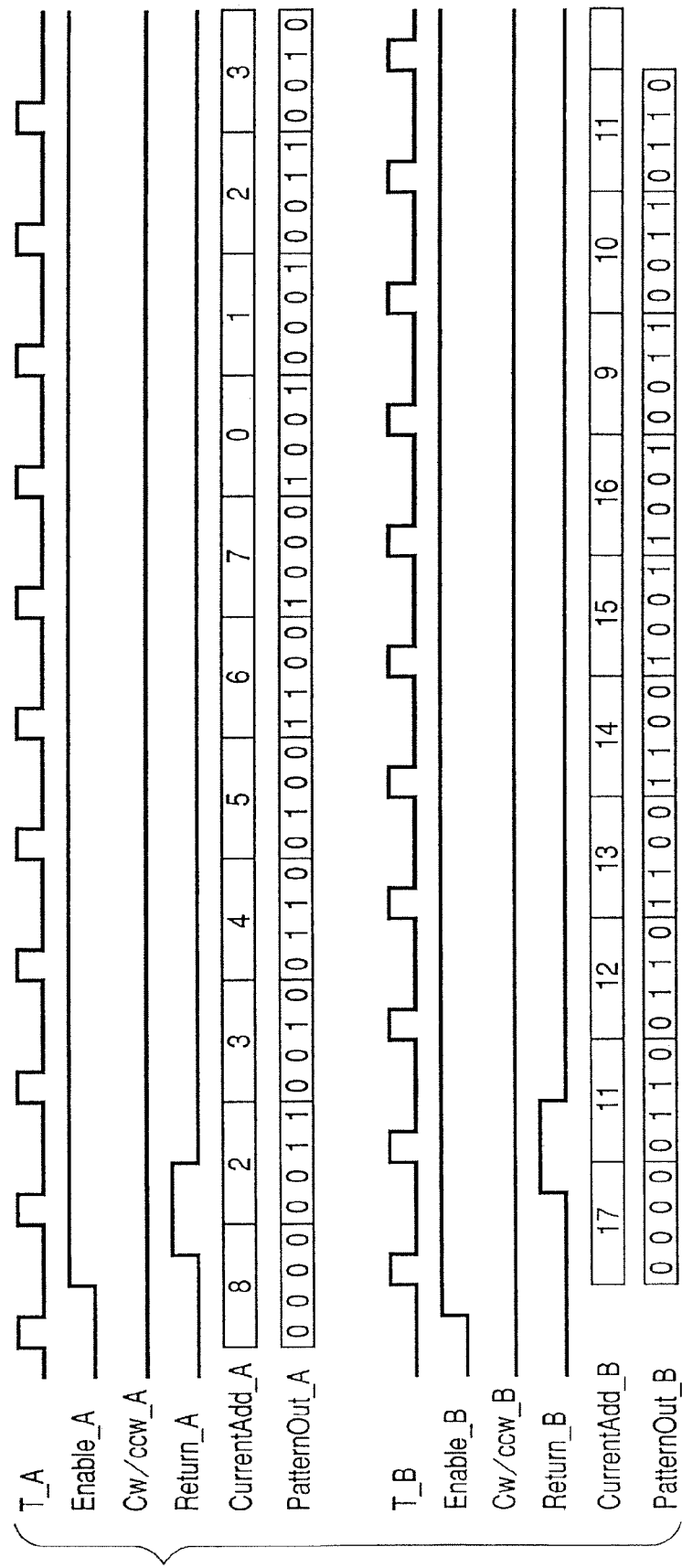
FIG. 5 is a timing chart showing a pattern output example.

FIG. 5 shows an output example of the pattern in the case where the rotation of the motors 21, 22 is controlled using the setting of FIG. 4. As shown in FIG. 5, an excitation pattern is outputted according to the rising edge of T_A, T_B. Moreover, the T_A, T_B are not synchronous so that the outputted excitation patterns do not have a synchronous relationship. Therefore, by using this control circuit 2 as in the example of FIG. 5, the two motors 21, 22 can be controlled independently at the outside.

Figure 6:
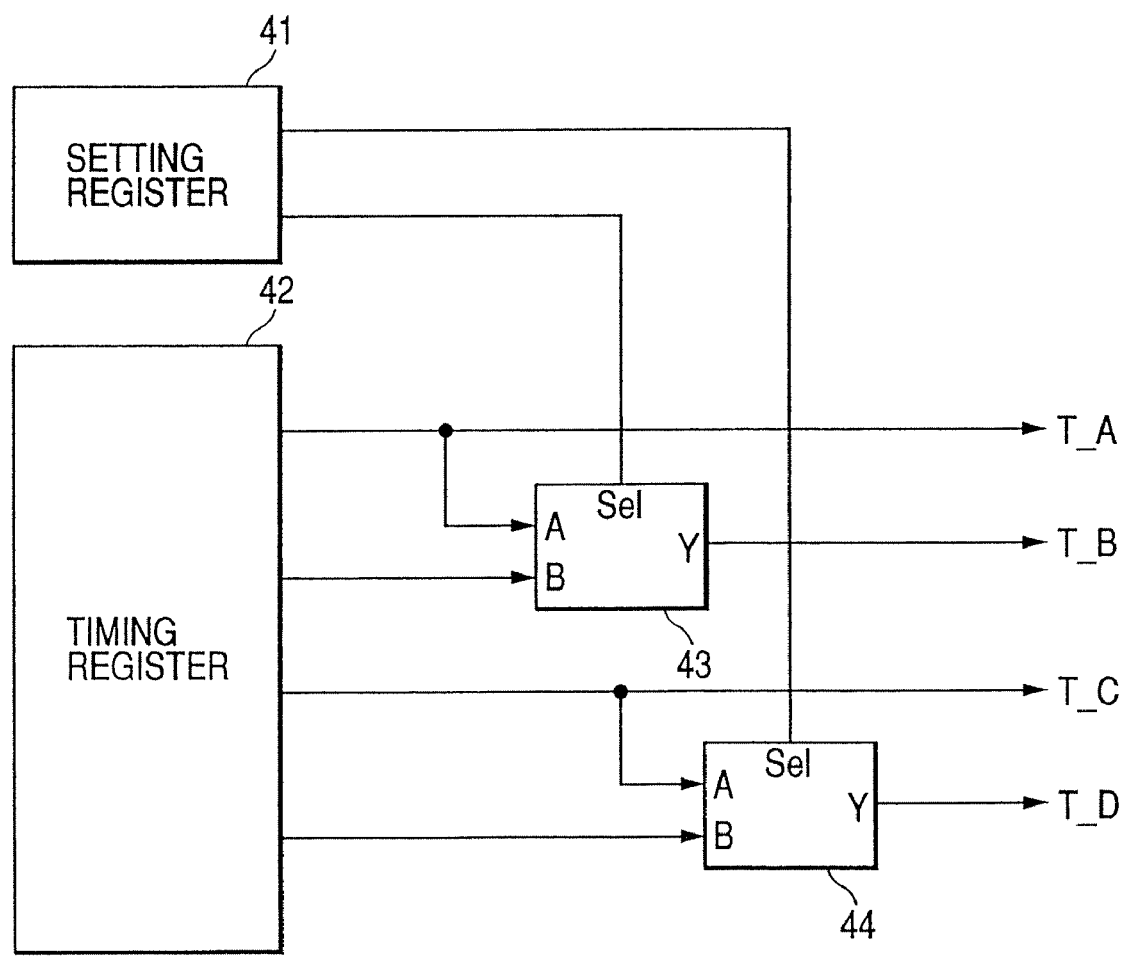
FIG. 6 is a block diagram showing the configuration of a changeover timing generating unit.

FIG. 6 is a block diagram showing the internal configuration of the changeover timing generating unit 31. This circuit 31 comprises a setting register 41, a timing register 42, and selectors 43, 44.

The setting register 41 is a block for controlling the operation of the internal circuit according to the register setting from the control CPU 1.

The timing register 42 is a block for generating a timing signal of T_x according to the register setting from the control CPU 1. In this block, every time "1" is written in a predetermined register, an "H" pulse is generated for the time of one clock of an operation basic clock (not shown).

The selectors 43, 44 are selectors for changing over the input signal according to the setting by the setting register 41. They change over whether the above-mentioned two pattern control blocks are controlled independently, or controlled in such a manner as to be interlocked with each other. Specifically, when the pattern output control unit (A) 34 and the pattern output control unit (B) 35 are controlled independently like the control by the motor driver 11 shown in FIG. 2, input B is selected by the selector 43 so that independent timing signals are outputted for T_A, T_B.

In contrast, when they are controlled in an interlocked manner like the control by the motor driver 12, input A is selected by the selector 43 so that the T_A timing signal is outputted for both of T_A and T_B. Thereby, the two pattern control unit look are operated in an interlocked manner so that a complicated excitation pattern such as that of the motor driver 12 can be dealt with.

Figure 7:
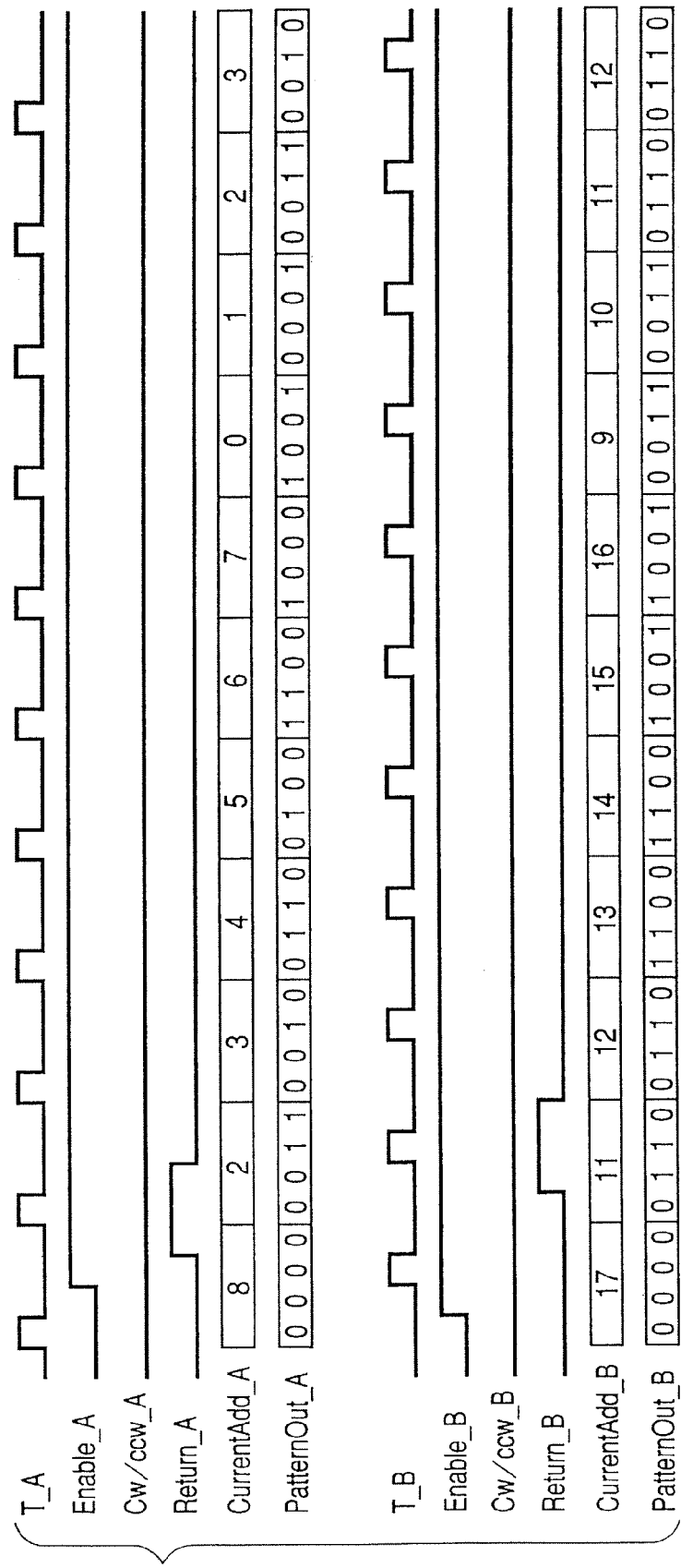
FIG. 7 is a timing chart showing another pattern output example.

FIG. 7 is a chart showing an output example in the case where the pattern output control unit (A) 34 and the pattern output control unit (B) 35 are operated, in such a manner as to be interlocked by T_A according to the setting by the pattern register 33 shown in FIG. 4. As shown in the figure, the output pattern is changed in an interlocked manner, regardless of the T_B timing.

According to this embodiment, various excitation patterns of the stepping motors can be dealt with in an inexpensive configuration without enlargement of the circuit size. That is, various excitation patterns can be dealt with in a stepping motor control circuit with the load on the control CPU 1 reduced, a plurality of drives can be enabled with a single register pattern memory, and a complicated motor excitation pattern circuit having more than 4 necessary control signal lines can be dealt with without enlargement of the internal circuit size.

Although the present invention has been explained with reference to the preferable embodiments, the present invention is not limited to the embodiment configurations, and various modifications can be executed within the range of the accompanied claims.

What is claimed is:

1. A control device for a motor, comprising:
a memory for storing an excitation pattern of the motor;
a first pattern control circuit for reading an excitation pattern from said memory and supplying the excitation pattern to a motor driver for driving the motor;
a second pattern control circuit for reading an excitation pattern from said memory and supplying the excitation pattern to the motor driver or another motor driver; and
an output control circuit capable of selecting a first output mode for using said first pattern control circuit and said second pattern control circuit independently and for supplying the excitation pattern to first and second motor drivers from said first and second pattern control circuits respectively, or a second output mode for using said first pattern control circuit and said second pattern control circuit synchronously and for supplying the excitation pattern to a single motor driver from said first and second pattern control circuit.

2. A control device according to claim 1, comprising a timing generating unit for generating first and second pattern transition timing signals showing the changing timing for the excitation patterns to be read out by said first and second pattern control circuits,
wherein the first and second pattern transition timing signals of said timing generating unit are inputted to said first and second pattern control circuits when said first output mode is selected by said output control circuit, and the same pattern transition timing signal is inputted to said first and second pattern control circuits when said second output mode is selected by said output control circuit.

3. A control device for a motor, comprising:
a memory for storing an excitation pattern of the motor;
a first pattern control circuit for reading an excitation pattern from said memory and supplying the excitation pattern to a first motor driver or a second motor driver for driving the motor;
a second pattern control circuit for reading an excitation pattern from said memory and supplying the excitation pattern to the first motor driver or the second motor driver; and
a timing generating circuit for generating timing signals showing the changing timing for the excitation patterns to be outputted from said first and second pattern control circuits
wherein said timing generating circuit (1) supplies first and second timing signals to said first and second pattern control circuits respectively, in a first output mode for supplying the excitation pattern to first and second motor drivers from said first and second pattern control circuits respectively, and (2) supplies the first timing signal to the first and second pattern control circuits, in a second output mode for supplying the excitation pattern to the first motor driver from said first and second pattern control circuits respectively.

4. An image forming apparatus equipped with the control device for a motor, according to claim 3.

5. A control method for a motor, comprising:
a storing step of storing an excitation pattern of the motor in a memory;
a first pattern control step of reading an excitation pattern from the memory and supplying the excitation pattern to a motor driver for driving the motor;
a second pattern control step of reading an excitation pattern from the memory and supplying the excitation pattern to the motor driver or another motor driver; and
an output control step of selecting a first output mode for controlling said first pattern control step and said second pattern control step independently and for supplying the excitation pattern to first and second motor drivers from said first and second pattern control steps respectively, or a second output mode for using said first pattern control step and said second pattern control step synchronously and for supplying the excitation pattern to a single motor driver from said first and second pattern control steps.

6. A control method according to claim 5, comprising a timing generating step of generating first and second pattern transition timing signals showing the changing timing for the excitation patterns to be read out in said first and second pattern control steps,
wherein the generated first and second pattern transition timing signals are inputted in said first and second pattern control steps when the first output mode is selected in said output control step, and the same pattern transition timing signal is inputted in said first and second pattern control steps when the second output mode is selected in said output control step.

7. A control method for a motor, comprising:
a storing step of storing an excitation pattern of the motor in a memory;
a first pattern control step of reading an excitation pattern from the memory and supplying the excitation pattern to a first motor driver or a second motor driver for driving the motor;
a second pattern control step of reading an excitation pattern from the memory and supplying the excitation pattern to the first motor driver or the second motor driver; and
a timing generating step of generating timing signals showing the changing timing for the excitation patterns to be outputted in said first and second pattern control steps,
wherein said timing generating step (1) supplies first and second timing signals to said first and second pattern control steps respectively, in a first output mode for supplying the excitation pattern to first and second motor drivers from said first and second pattern control steps respectively, and (2) supplies the first timing signal to the first and second pattern control steps, in a second output mode for supplying the excitation pattern to the first motor driver from said first and second pattern control steps respectively.

* * * * *